United States Patent
Bakhsh et al.

(10) Patent No.: US 6,565,118 B2
(45) Date of Patent: May 20, 2003

(54) FOLDED INFLATABLE CURTAIN

(75) Inventors: Ali Emam Bakhsh, Rochester Hills, MI (US); Russell E. Stein, Leonard, MI (US); Ayad G. Nayef, Sterling Heights, MI (US); Rico Scott Bertossi, Richmond, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 66 days.

(21) Appl. No.: 09/932,416

(22) Filed: Aug. 17, 2001

(65) Prior Publication Data

US 2002/0027341 A1 Mar. 7, 2002

Related U.S. Application Data

(63) Continuation-in-part of application No. 09/576,787, filed on May 23, 2000, now Pat. No. 6,361,068.

(51) Int. Cl.[7] ............................................. B60R 21/22
(52) U.S. Cl. ................................ 280/730.2; 280/743.1
(58) Field of Search ......................... 280/730.2, 743.1, 280/743.2, 730.1, 728.2; 53/116, 117, 429; 493/405, 409, 451, 458, 940

(56) References Cited

U.S. PATENT DOCUMENTS

| | | | |
|---|---|---|---|
| 3,731,949 A | 5/1973 | Radke | |
| 5,439,247 A | 8/1995 | Kolb | |
| 5,588,672 A | 12/1996 | Karlow et al. | |
| 5,730,463 A | 3/1998 | Fischer et al. | |
| 5,765,863 A * | 6/1998 | Storey et al. | 280/729 |
| 5,788,270 A | 8/1998 | Haland et al. | |
| 5,865,462 A | 2/1999 | Robins et al. | |
| 5,884,937 A | 3/1999 | Yamada | |
| 5,899,490 A | 5/1999 | Wipasuramonton et al. | |
| 5,899,491 A | 5/1999 | Tschaeschke | |
| 5,924,723 A | 7/1999 | Brantman et al. | |
| 5,960,611 A | 10/1999 | Aigner et al. | |
| 6,010,149 A | 1/2000 | Riedel et al. | |
| 6,073,961 A | 6/2000 | Bailey et al. | |
| 6,082,761 A | 7/2000 | Kato et al. | |
| 6,168,191 B1 | 1/2001 | Webber et al. | |
| 6,186,534 B1 | 2/2001 | Heinz | |
| 6,231,070 B1 * | 5/2001 | Sunabashiri et al. | 280/730.2 |
| 6,332,628 B1 * | 12/2001 | Tschaeschke | 280/730.2 |
| 6,361,068 B1 * | 3/2002 | Stein et al. | 280/730.2 |
| 6,386,584 B1 * | 5/2002 | Bowser | 280/743.1 |
| 6,428,037 B1 * | 8/2002 | Bakhsh et al. | 280/729 |

* cited by examiner

Primary Examiner—Paul N. Dickson
Assistant Examiner—David R. Dunn
(74) Attorney, Agent, or Firm—Tarolli, Sundheim, Covell & Tummino L.L.P.

(57) ABSTRACT

Apparatus (10) includes an inflatable vehicle occupant protection device (14) inflatable away from a vehicle roof (18) into a position between the side structure (16) of the vehicle (12) and a vehicle occupant. An anchor device (90) is connected to the side structure (16). A flexible elongated member (80) has a first end (82) connected to a first location (84) spaced from a rear edge (72) of the protection device (14) and an opposite second end (86) connected to the anchor device (90). The protection device (14) prior to inflation is folded along a first fold line (112) spaced from the rear edge (72) and extending proximate the first location (84) in a direction transverse to a lower edge (62) of the protection device (14). The protection device (14) is folded along at least one fold line (114, 116) located forward of the first fold line (112) such that the first fold line extends vertically in the vehicle (12), adjacent to and entirely forward of the anchor device (90).

20 Claims, 5 Drawing Sheets

Fig.3

FOLDED INFLATABLE CURTAIN

CROSS REFERENCE TO RELATED APPLICATIONS

This application is a continuation-in-part of U.S. application Ser. No. 09/576,787, now U.S. Pat. No. 6,361,068 which was filed on May 23, 2000.

FIELD OF THE INVENTION

The present invention relates to an inflatable vehicle occupant protection device for helping to protect a vehicle occupant in the event of a side impact to the vehicle and/or a vehicle rollover. In particular, the present invention relates to an inflatable curtain that, prior to inflation, is folded so as to help minimize the required length of a tether that connects the inflatable curtain to the vehicle.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. Such known inflatable curtains are typically placed in a stored position in a housing that opens upon inflation of the inflatable curtain. A known inflatable curtain is inflated from a deflated condition by inflation fluid directed from an inflator into the inflatable curtain.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The apparatus also includes an anchor device connected to the side structure of the vehicle and a flexible elongated member. The flexible elongated member has a first end connected to the inflatable vehicle occupant protection device at a first location spaced from a rear edge of the inflatable vehicle occupant protection device. The flexible elongated member has an opposite second end connected to the anchor device.

The inflatable vehicle occupant protection device, prior to inflation, is folded along a first fold line spaced from the rear edge. The first fold line extends proximate the first location in a direction transverse to a lower edge of the inflatable vehicle occupant protection device. The inflatable vehicle occupant protection device is folded along at least one fold line located forward of the first fold line such that the first fold line extends vertically in the vehicle and such that the first fold line is positioned adjacent to and entirely forward of the anchor device.

The present invention also relates to a method for placing the inflatable vehicle occupant protection device in a stored position. The method includes the step of folding the inflatable vehicle occupant protection device along a first fold line spaced from the rear edge of the inflatable vehicle occupant protection device. The first fold line extends proximate the first location in a direction transverse to the lower edge of the inflatable vehicle occupant protection device. The method also includes the step of folding the inflatable vehicle occupant protection device along at least one fold line located forward of the first fold line such that the first fold line extends vertically in the vehicle and such that the first fold line is positioned adjacent to and entirely forward of the anchor device. The method further comprises the step of rolling up the inflatable vehicle occupant protection device in an outboard direction into a stored position extending along the side structure of the vehicle near the intersection of the side structure of the vehicle and the vehicle roof.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
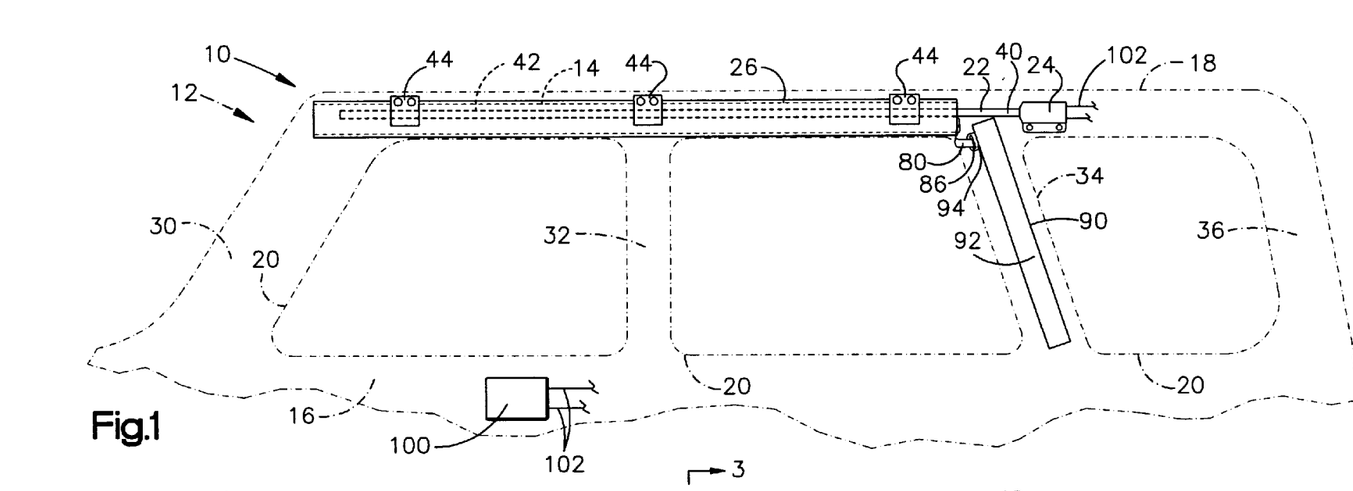
FIG. 1 is a schematic view of an apparatus for helping to protect a vehicle occupant illustrating the apparatus in a deflated condition, according to the invention.
Figure 2:
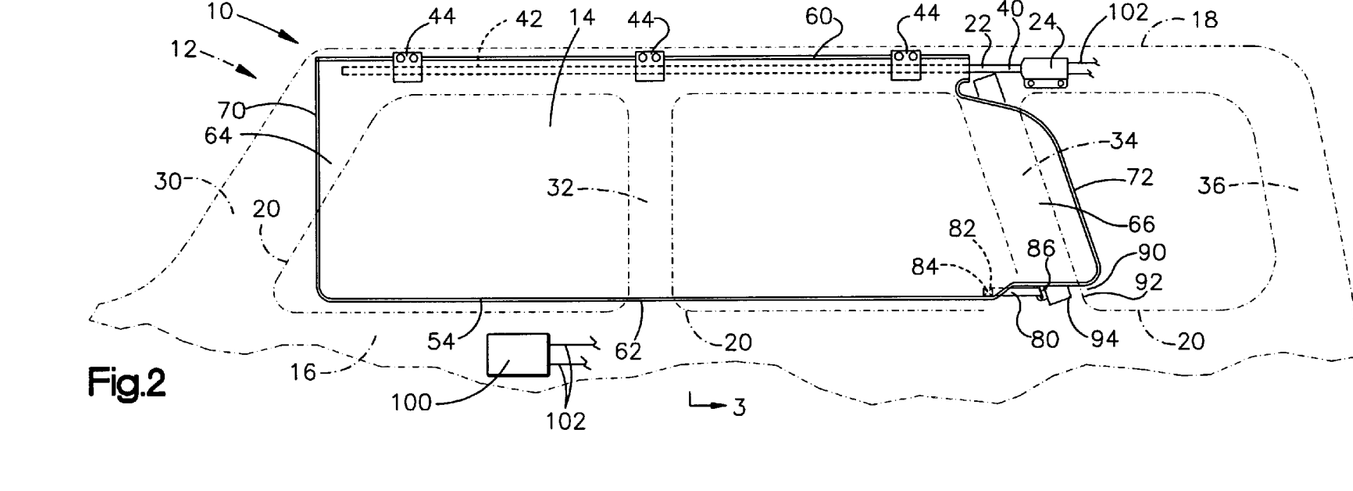
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes side windows 20, an A pillar 30, a B pillar 32, a C pillar 34, and a D pillar 36. An inflator 24 is connected in fluid communication with the inflatable curtain 14 through a fill tube 22. The fill tube 22 may be constructed of any suitable material, such as metal, plastic, or fabric. Also, those skilled in the art will recognize that the fill tube 22 may be omitted, in which case the inflator 24 may be connected directly to the inflatable curtain 14.

The fill tube 22 has a first end portion 40 for receiving fluid from the inflator 24. The fill tube 22 may be connected directly to the inflator 24 or a manifold (not shown) may connect the fill tube to the inflator. The fill tube 22 has a second end portion 42 disposed in the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20. The fill tube 22, inflatable curtain 14 and housing 26 are connected to the vehicle 12 by known means 44 (FIGS. 1 and 2), such as brackets.

Figure 3:
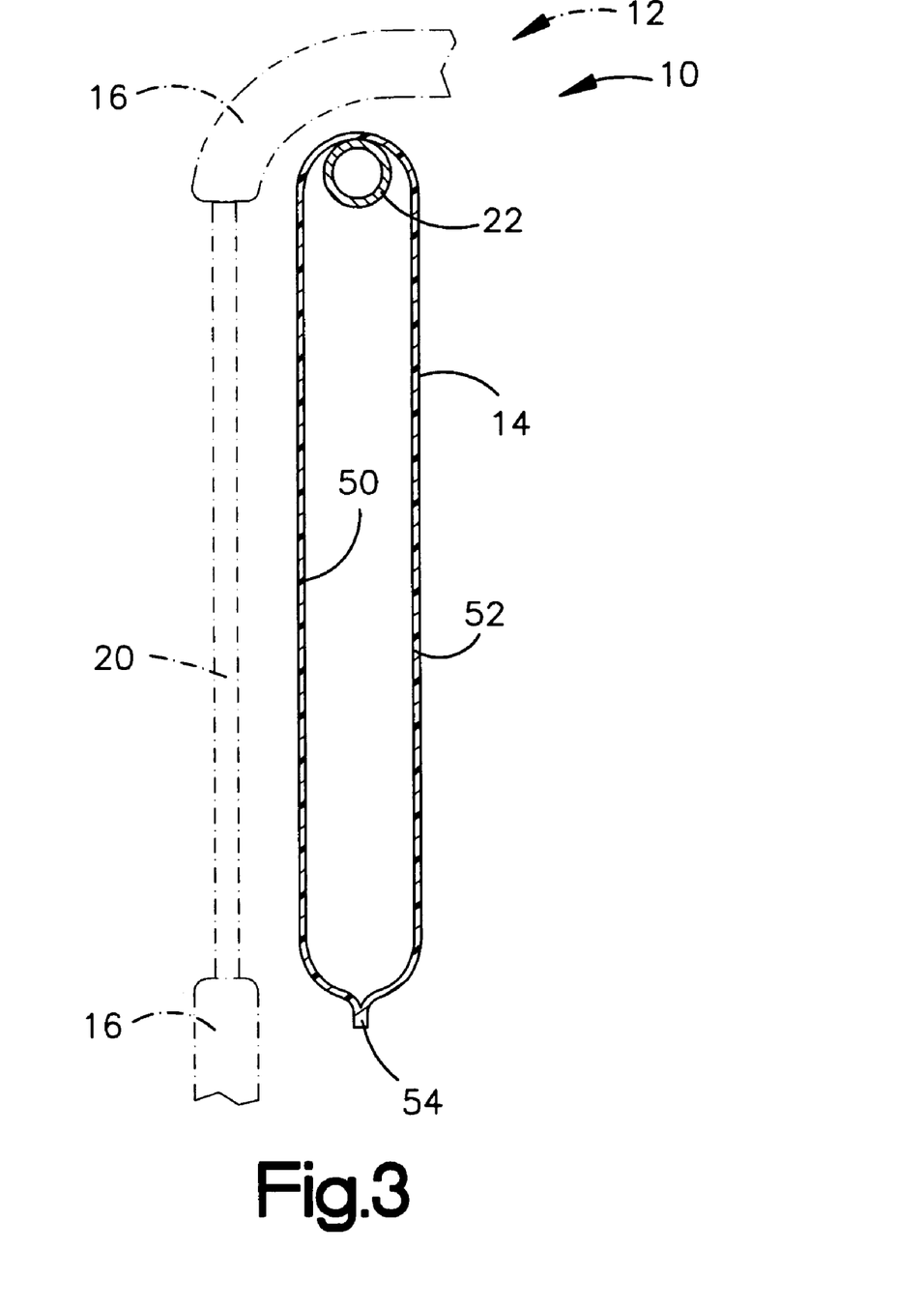
FIG. 3 is a sectional view of the apparatus taken generally along line 3—3 in FIG. 2.

As best illustrated in FIG. 3, the inflatable curtain 14 comprises first and second panels 50 and 52 that are arranged in an overlying manner. Preferably, overlapping portions of the first and second panels 50 and 52 are secured together by weaving or stitching the panels together along at least a portion of a perimeter 54 (FIGS. 2 and 3) of the inflatable curtain 14 to form an inflatable volume of the curtain. The first and second panels 50 and 52 could also be interconnected at desired locations within the perimeter 54 to form inflatable chambers (not shown) of the inflatable curtain 14.

The perimeter 54 is defined at least partially by an upper edge 60 (FIG. 2) of the inflatable curtain 14, an opposite lower edge 62 of the curtain, and front and rear portions 64 and 66, respectively, of the curtain spaced apart horizontally along the upper and lower edges. In the embodiment illustrated in FIG. 2, the front and rear portions 64 and 66 of the inflatable curtain 14 are partially defined by front and rear edges 70 and 72, respectively, that are spaced horizontally apart along the upper and lower edges 60 and 62 and extend between the upper and lower edges. Those skilled in the art will appreciate that the inflatable curtain 14 may have alternate shapes or configurations commensurate with different vehicle configurations and desired performance characteristics. For example, the upper and/or lower edges 50 and 52 could be curved and extended until they intersect, in which case the front and rear portions 64 and 66 would be defined by the intersecting upper and lower edges.

As illustrated in FIG. 3, the inflatable curtain 14 is formed from a sheet of material that is folded over to form the overlying first and second panels 60 and 62. It will be recognized by those skilled in the art, however, that the inflatable curtain 14 could have alternative constructions. For example, the first and second panels 50 and 52 could be formed from separate sheets of material arranged in an overlying manner and secured together by stitching, ultrasonic bonding, heat welding, or adhesive bonding that extends around the entire perimeter 44 of the panels to form the inflatable curtain 14. As a further alternative, the inflatable curtain 14 could be woven as a single piece of material.

The first and second panels 50 and 52 are preferably constructed of a fabric, such as nylon, that may be coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14. The first and second panels 50 and 52 may also be formed of single or multi-layered sheets of material.

The apparatus 10 also includes an anchor device 90 connected to the side structure 16 of the vehicle 12. In the illustrated embodiment, the anchor device 90 comprises a slider mechanism that includes an elongated track 92 and an element 94 that is slidable along the length of the track. In the illustrated embodiment, the track 92 is connected to the C pillar 34 and extends in a direction generally parallel to the C pillar. The track 92 could, however, extend at a different angle relative to the vehicle side structure 16 and could be connected to the vehicle 12 at a different location. For example, in a configuration wherein the inflatable curtain 14 extends between the A pillar 30 and the D pillar 36, the track 90 could be connected to the D pillar and extend in a direction generally parallel to the D pillar.

The apparatus 10 also includes a flexible elongated member in the form of a tether 80. The tether 80 has a first end 82 connected to the inflatable curtain 14 at a first location 84 on the curtain. The tether 80 has a second end 86, opposite the first end 82, that is connected to the element 94. The first location 84 is spaced away from the rear edge 72 of the inflatable curtain 14. In the illustrated embodiment, the first location 84 is positioned adjacent the lower edge 62 of the inflatable curtain 14. The first location 84 could, however, be spaced away from the lower edge 62.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 in response to the sensing of a side impact or a vehicle rollover. In the event of a rollover of the vehicle or a side impact to the vehicle 12 for which inflation of the curtain 14 is desirable, the sensor mechanism 100 provides an electrical signal over lead wires 102 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. The housing 26 opens and the inflatable curtain 14 inflates away from the roof 18 in a downward direction as shown in the drawings and in a downward direction with respect to the direction of forward travel of the vehicle 12 into the position illustrated in FIGS. 2 and 3.

During inflation of the inflatable curtain 14, the curtain pulls on the element 94 via the tether 80. This causes the element 94 to slide along the track 92 in a direction away from the vehicle roof 18. Preferably, the anchor device 90 is adapted to permit the element 94 to move along the track 92 in the direction away from the vehicle roof 18 and to prevent movement of the element in an opposite direction, i.e., towards the vehicle roof. Thus, when the inflatable curtain 14 is inflated, the element 94 is preferably latched in the farthest position from the vehicle roof 18 that the element 94 reaches along the track 92.

The inflatable curtain 14 (FIG. 3), when inflated, extends along the side structure 16 of the vehicle 12 and is positioned between the side structure and any occupant (not shown) of the vehicle. As illustrated in FIGS. 2 and 3, when the inflatable curtain 14 is in the inflated condition, the first panel 50 is positioned adjacent the side structure 16 of the vehicle 12. The upper edge 60 is positioned adjacent to the intersection of the roof 18 and the side structure 16 of the vehicle 12. The front portion 64 is positioned adjacent to the A pillar 30 of the vehicle 12. The rear portion 66 of the inflatable curtain 14 is positioned adjacent to the C pillar 34 of the vehicle 12. The inflatable curtain 14 extends between the A pillar 30 and the C pillar 34 of the vehicle 12 and overlies at least a portion of the A pillar, C pillar, and the B pillar 32 of the vehicle.

It will be recognized by those skilled in the art that the inflatable curtain 14 may have alternative configurations. For example, in the illustrated embodiment, the inflatable curtain 14 extends between the A pillar 30 and the C pillar 34 of the vehicle 12. The inflatable curtain 14 could, however, extend between the A pillar 30 and the D pillar 36 or between any two of the vehicle pillars. Also, in the illustrated embodiment, the first and second panels 50 and 52 are interconnected only along the perimeter 54 of the inflatable curtain 14. The first and second panels 50 and 52 could, however, be interconnected at any desired location within the perimeter 54 of the inflatable curtain 14.

The inflatable curtain 14, when inflated, helps to protect a vehicle occupant in the event of a vehicle rollover or a side impact to the vehicle 12. The inflatable curtain 14, when inflated, helps to absorb the energy of impacts with the curtain and helps to distribute the impact energy over a large area of the curtain. When the inflatable curtain 14 is in the inflated condition of FIGS. 2 and 3, the tether 80 and the anchor device 90 help to maintain the curtain positioned adjacent the side structure 16 of the vehicle 12 between the side structure and any occupants of the vehicle. When the inflatable curtain is in the inflated position, the rear portion 66 overlies the anchor device 90.

The inflatable curtain 14 is placed in the stored position of FIG. 1 by folding and rolling up the curtain, and then placing the curtain in the housing 26. The inflatable curtain 14, when placed in the stored position, is preferably rolled in an outboard direction along an axis that extends generally parallel to the lower edge 62 of the curtain. By outboard direction, it is meant that the inflatable curtain 14 is rolled in a direction outboard of the vehicle 12, towards the vehicle side structure 16. To begin the outboard roll, the lower edge 62 of the inflatable curtain 14 is folded over towards the vehicle side structure 16, i.e., in an outboard direction. The outboard roll of the inflatable curtain 14 continues and the curtain is placed in the housing 26.

Those skilled in the art will appreciate that it is desirable to minimize the length of the tether 80 in order to help reduce the amount of slack in the tether when the inflatable curtain 14 is inflated. This helps to prevent movement of the inflatable curtain 14 away from the desired inflated position of the curtain. According to the present invention, the inflatable curtain 14 is folded and rolled into the stored position (FIG. 2) in a manner which helps to minimize the required length of the tether 80.

Figure 4:
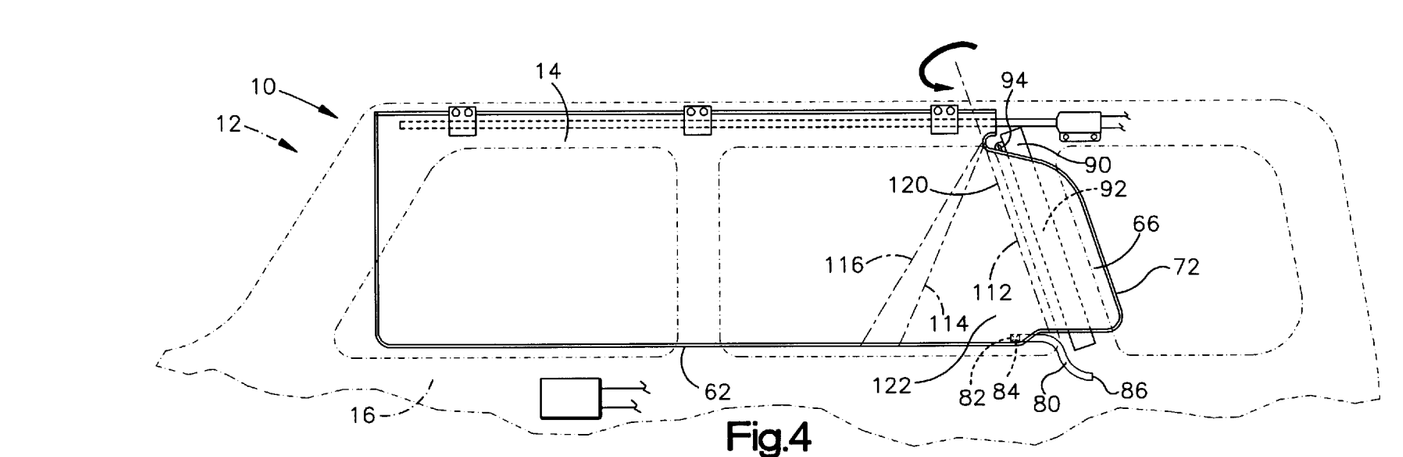
FIGS. 4–8 are a schematic views of the apparatus of FIG. 1 illustrating the apparatus in different positions.

Referring to FIG. 4, the apparatus 10 is illustrated prior to inflation of the inflatable curtain 14 and prior to placing the curtain in the stored position. It will be appreciated that the tether 80 must have a length sufficient to extend from the first location 84 to the element 94 when the inflatable curtain 14 is in the stored position. If the inflatable curtain 14 is rolled up without first folding the curtain, the tether 80 must have a length sufficient to extend from the first location 84 to the rearwardmost extent of the rolled up curtain (i.e., the rear edge 72) and from the rear edge to the element 94. Thus, because rear portion 66 of the inflatable curtain 14 overlies and extends rearward of the anchor device 90, the tether 80 would necessarily extend away from the element 94 to the rearwardmost extent of the rolled up curtain in order to exit the rolled up curtain. The tether 80 would then extend back in an opposite direction towards the element 94 in order to be connected to the element.

According to the present invention, the inflatable curtain 14 is folded along a first fold line indicated at 112, a second fold line indicated at 114, and a third fold line indicated at 116 prior to rolling the curtain into the stored position. The inflatable curtain 14 is folded along the fold lines 112, 114, and 116 in order to help minimize the required length of the tether 80. The inflatable curtain 14 may include indicia, such as ink, applied to the curtain in order to indicate the first, second, and third fold lines 112, 114 and 116. Such indicia is illustrated by the dashed lines representing the first fold line 112, second fold line 114, and third fold line 116 in FIG. 4.

The rear portion 66 of the inflatable curtain 14 is partially defined by the first fold line 112. The first fold line 112 extends in a direction transverse to the lower edge 62 of the inflatable curtain 14 and is positioned proximate the first location 84. By proximate, it is meant that the first fold line 112 may extend through or adjacent the second location 82. In the illustrated embodiment, the first fold line 112 extends adjacent the first location 84. Also, in the illustrated embodiment, the first fold line 112 extends generally parallel to the track 92 of the anchor device 90. The first fold line 112 could, however, extend at some other desired angle. An upper end 120 of the first fold line 112 is positioned forward of the anchor mechanism 90.

Figure 5:
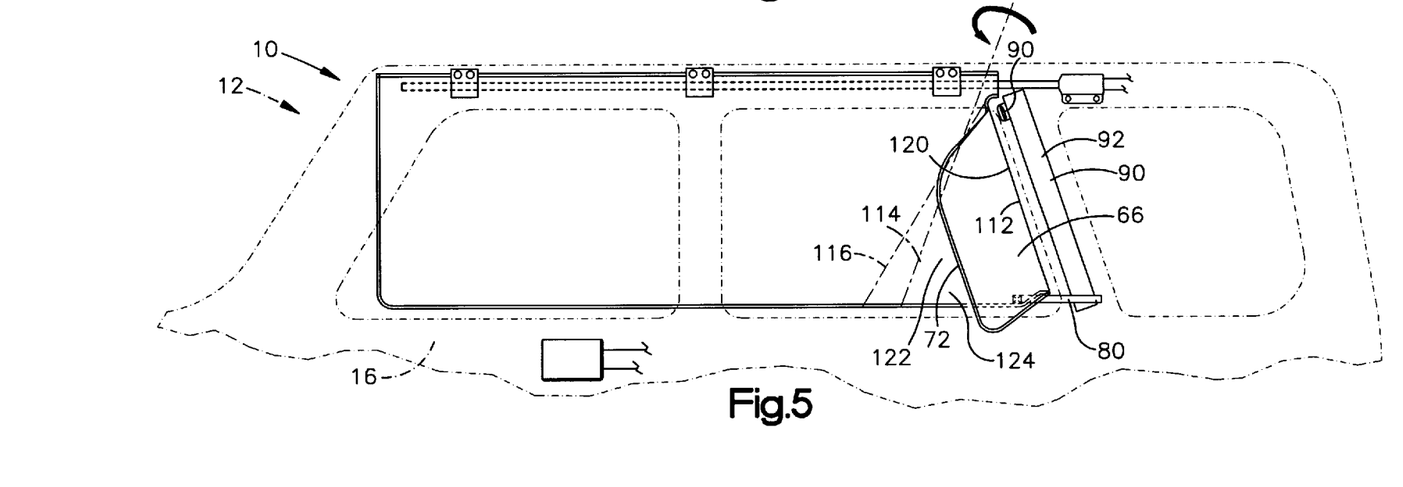

When placing the inflatable curtain 14 in the stored position, the rear portion 66 is folded over in a generally forward and inboard direction along the first fold line 112. This is indicated generally by the curved arrow in FIG. 4. When the inflatable curtain 14 is in the folded condition of FIG. 4, the rear portion overlies a forward portion 122 of the curtain positioned forward of the first fold line. The forward portion 122 is thus positioned between the rear portion 66 and the vehicle side structure 16. This places the inflatable curtain 14 in the condition illustrated in FIG. 5. As illustrated in FIG. 5, the rear portion 66, when folded over along the first fold line 112, is moved away from the position overlying the anchor device 90. The first fold line 112 thus becomes the rearwardmost extent of the inflatable curtain 14 when the rear portion 66 is folded over along the first fold line. The first location 84 is thus positioned adjacent or near the rearwardmost extent of the inflatable curtain 14.

Figure 6:
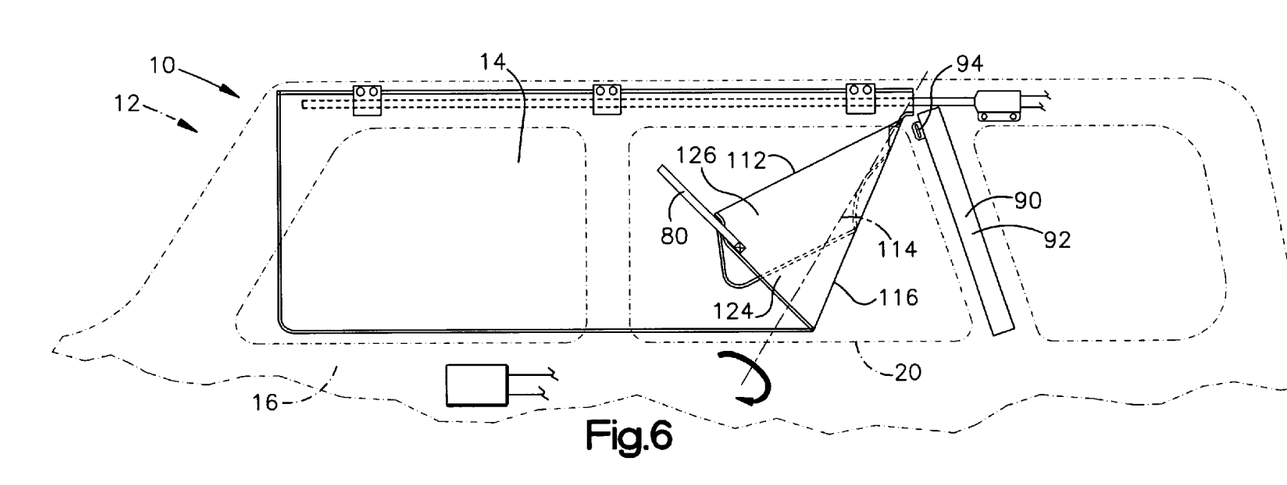

Next, a portion 124 of the inflatable curtain 14 extending generally between the rear edge 72 and the third fold line 116 is folded over in a generally forward and inboard direction about the third fold line. The portion 124 is folded in an inboard direction away from the vehicle side structure 16 as indicated generally by the curved arrow in FIG. 5. This places the inflatable curtain 14 in the position illustrated in FIG. 6.

Next, a portion 126 of the inflatable curtain 14 extending generally between the rear edge 72 and the is second fold line 114 is folded over in a generally rearward and inboard direction about the second fold line. The portion 126 is folded in an inboard direction away from the vehicle side structure 16 as indicated generally by the curved arrow in FIG. 6. This places the inflatable curtain 14 in the position illustrated in FIG. 7.

Figure 7:
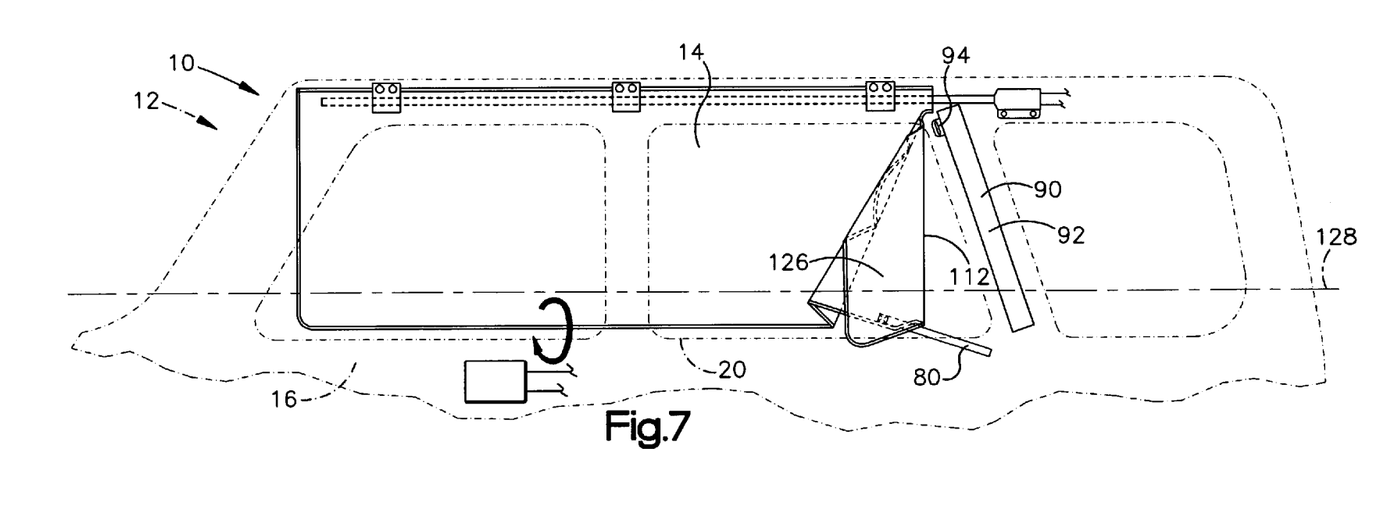

As shown in FIG. 7, the first fold line 112 is positioned just forward of the anchor device 90 and extends generally vertically in the vehicle 12. The first location 84 is thus positioned forward of the anchor device 90. When the inflatable curtain 14 is in the position illustrated in FIG. 7, the first fold line 112 again forms the rearwardmost extent of the folded inflatable curtain 14. The first fold line 112 is positioned entirely forward of the anchor device 90 and extends vertically in the vehicle 12. By vertically, it is meant that the first fold line 112 preferably extends in a substantially perpendicular direction with respect to a longitudinal axis 128 of the vehicle 12. When the inflatable curtain 14 is in the folded condition, the first location 84 is positioned adjacent this rearwardmost extent, i.e., the first fold line 112, of the curtain.

The inflatable curtain 14 is rolled up in the outboard direction into the stored position while the curtain is in the folded position of FIG. 7. The outboard direction is indicated generally by the curved arrow in FIG. 7. As the inflatable curtain 14 is rolled up, the tether 80 extends from the rearwardmost extent, i.e., the first fold line 112, of the curtain. This is illustrated in FIG. 8.

Figure 8:
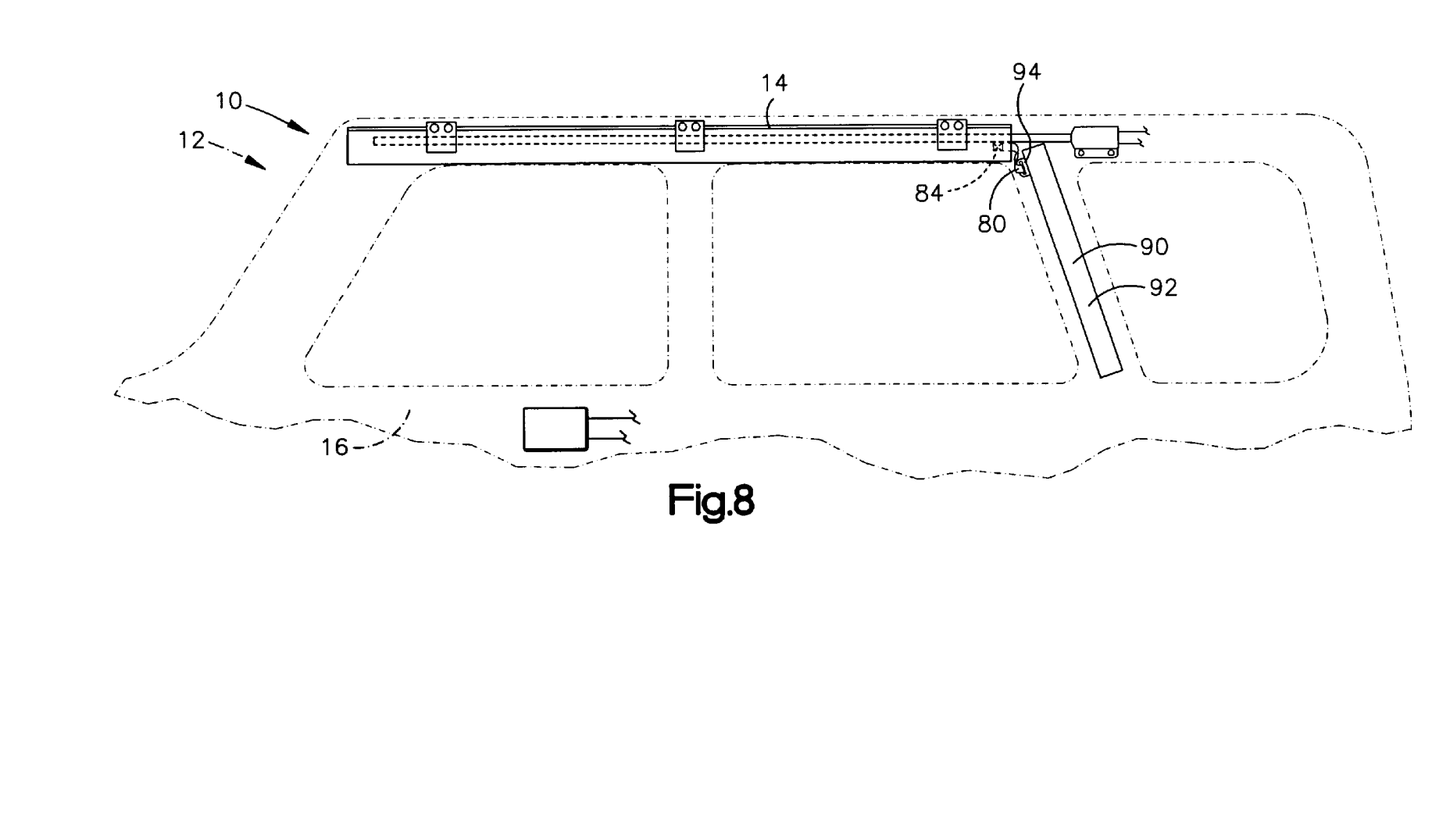

As shown in FIG. 8, when the inflatable curtain is rolled up in the stored position, the first location 84 is positioned adjacent or near the anchor device 90. In particular, the first location 84 is positioned adjacent or near the element 94. This allows the tether 80 to extend from the first location 84 directly to the element 94. The folded inflatable curtain 14 of the present invention thus helps to minimize the required length of the tether 80.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant;

an inflation fluid source that provides inflation fluid for inflating said inflatable vehicle occupant protection device;

an anchor device connected to the side structure of the vehicle; and a flexible elongated member having a first end connected to said inflatable vehicle occupant protection device at a first location spaced from a rear edge of said inflatable vehicle occupant protection device, said flexible elongated member having an opposite second end connected to said anchor device;

said inflatable vehicle occupant protection device prior to inflation being folded along a first fold line spaced from said rear edge, said first fold line extending proximate said first location in a direction transverse to a lower edge of said inflatable vehicle occupant protection device, said inflatable vehicle occupant protection device being folded along at least one fold line located forward of said first fold line such that said first fold line extends vertically in the vehicle and such that said first fold line is positioned adjacent to and entirely forward of said anchor device.

2. The apparatus recited in claim 1, wherein said inflatable vehicle occupant protection device includes a rear portion located rearward of said first fold line and being at least partially defined by said rear edge, said rear portion having a position overlying at least a portion of said anchor device when said inflatable vehicle occupant protection device is inflated, said rear portion being moved away from said position overlying at least a portion of said anchor device when said inflatable vehicle occupant protection device is folded along said first fold line.

3. The apparatus recited in claim 2, wherein said first fold line extends generally parallel to said anchor device.

4. The apparatus recited in claim 2, wherein said rear portion of said inflatable vehicle occupant protection device is folded over along said first fold line such that said rear portion overlies a forward portion of said inflatable vehicle occupant protection device located forward of said first fold line, said forward portion being positioned between said rear portion and the vehicle side structure when said rear portion is folded along said first fold line.

5. The apparatus recited in claim 4, wherein said at least one fold line comprises second and third fold lines located on said forward portion, said second fold line being spaced a first distance from said first fold line, said third fold line being spaced a second distance from said first fold line greater than said first distance, a portion of said inflatable vehicle occupant protection device located between said third fold line and said rear edge prior to inflation being folded forward in an inboard direction along said third fold line, a portion of said inflatable vehicle occupant protection device located between said second fold line and said rear edge being folded rearward in an inboard direction along said second fold line.

6. The apparatus recited in claim 1, wherein said inflatable vehicle occupant protection device when folded along said first fold line and said at least one fold line located forward of said first fold line is rolled up in an outboard direction into a stored position extending along the side structure of the vehicle near the intersection of the side structure of the vehicle and the vehicle roof.

7. The apparatus recited in claim 1, wherein said first fold line extends adjacent said first location on said inflatable vehicle occupant protection device.

8. The apparatus recited in claim 1, wherein said first location is adjacent said lower edge.

9. The apparatus recited in claim 1, wherein said first location intersects said lower edge.

10. The apparatus recited in claim 1, wherein said first location is positioned rearward of at least a portion of said anchor device when said inflatable vehicle occupant protection device is inflated.

11. The apparatus recited in claim 1, wherein said inflatable vehicle occupant protection device includes indicia for indicating said first fold line and said at least one fold line located forward of said first fold line.

12. The apparatus recited in claim 1, wherein said anchor device comprises a slider mechanism.

13. The apparatus recited in claim 12, wherein said slider mechanism comprises a track and an element slidable along said track, said second end of said flexible elongated member being connected to said element.

14. The apparatus recited in claim 1, wherein said inflatable vehicle occupant protection device comprises an inflatable curtain.

15. The apparatus recited in claim 14, further comprising a fill tube for delivering said inflation fluid from said inflation fluid source to said inflatable curtain.

16. A method for placing an inflatable vehicle occupant protection device in a stored position, said inflatable vehicle occupant protection device comprising a portion of an apparatus for helping to protect an occupant of a vehicle, said inflatable vehicle occupant protection device being inflatable away from a roof of the vehicle into a position between a side structure of the vehicle and a vehicle occupant, said apparatus further including an anchor device connected to the side structure and a flexible elongated member having a first end connected to said inflatable vehicle occupant protection device at a first location spaced from a rear edge of said inflatable vehicle occupant protection device and an opposite second end connected to said anchor device, said method comprising the steps of:

folding said inflatable vehicle occupant protection device along a first fold line spaced from a rear edge of said inflatable vehicle occupant protection device, said first fold line extending proximate said first location in a direction transverse to a lower edge of said inflatable vehicle occupant protection device;

folding said inflatable vehicle occupant protection device along at least one fold line located forward of said first fold line such that said first fold line extends vertically in the vehicle and such that said first fold line is positioned adjacent to and entirely forward of said anchor device; and rolling up said inflatable vehicle occupant protection device in an outboard direction into a stored position extending along the side structure of the vehicle near the intersection of the side structure of the vehicle and the vehicle roof.

17. The method recited in claim 16, wherein said inflatable vehicle occupant protection device includes a rear portion at least partially defined by said rear edge, said rear portion having a position overlying at least a portion of said anchor device when said inflatable vehicle occupant protection device is inflated, said step of folding said inflatable vehicle occupant protection device along a first fold line comprising the step of moving said rear portion away from said position overlying at least a portion of said anchor device.

18. The method recited in claim 17, wherein said step of moving said rear portion comprises the step of folding said rear portion over along said first fold line such that said rear portion overlies a forward portion of said inflatable vehicle occupant protection device located forward of said first fold line, said forward portion being positioned between said rear portion and the vehicle side structure when said rear portion is folded along said first fold line.

19. The method recited in claim 18, wherein said at least one fold line comprises second and third fold lines located on said forward portion, said second fold line being spaced a first distance from said first fold line, said third fold line being spaced a second distance from said first fold line greater than said first distance, said step of folding said inflatable vehicle occupant protection device along at least one fold line located forward of said first fold line comprising the steps of:

folding a portion of said inflatable vehicle occupant protection device located between said third fold line and said rear edge forward in an inboard direction along said third fold line prior to inflation of said inflatable vehicle occupant protection device; and folding a portion of said inflatable vehicle occupant protection device located between said second fold line and said rear edge rearward in an inboard direction along said second fold line prior to inflation of said inflatable vehicle occupant protection device.

20. The method recited in claim 16, further comprising the step of providing indicia for indicating said first fold line and said at least one fold line located forward of said first fold line.

* * * * *